May 27, 1958
W. H. CARPENTER ET AL
2,836,037
REFRIGERATION SYSTEM
Filed Feb. 7, 1955
2 Sheets-Sheet 1
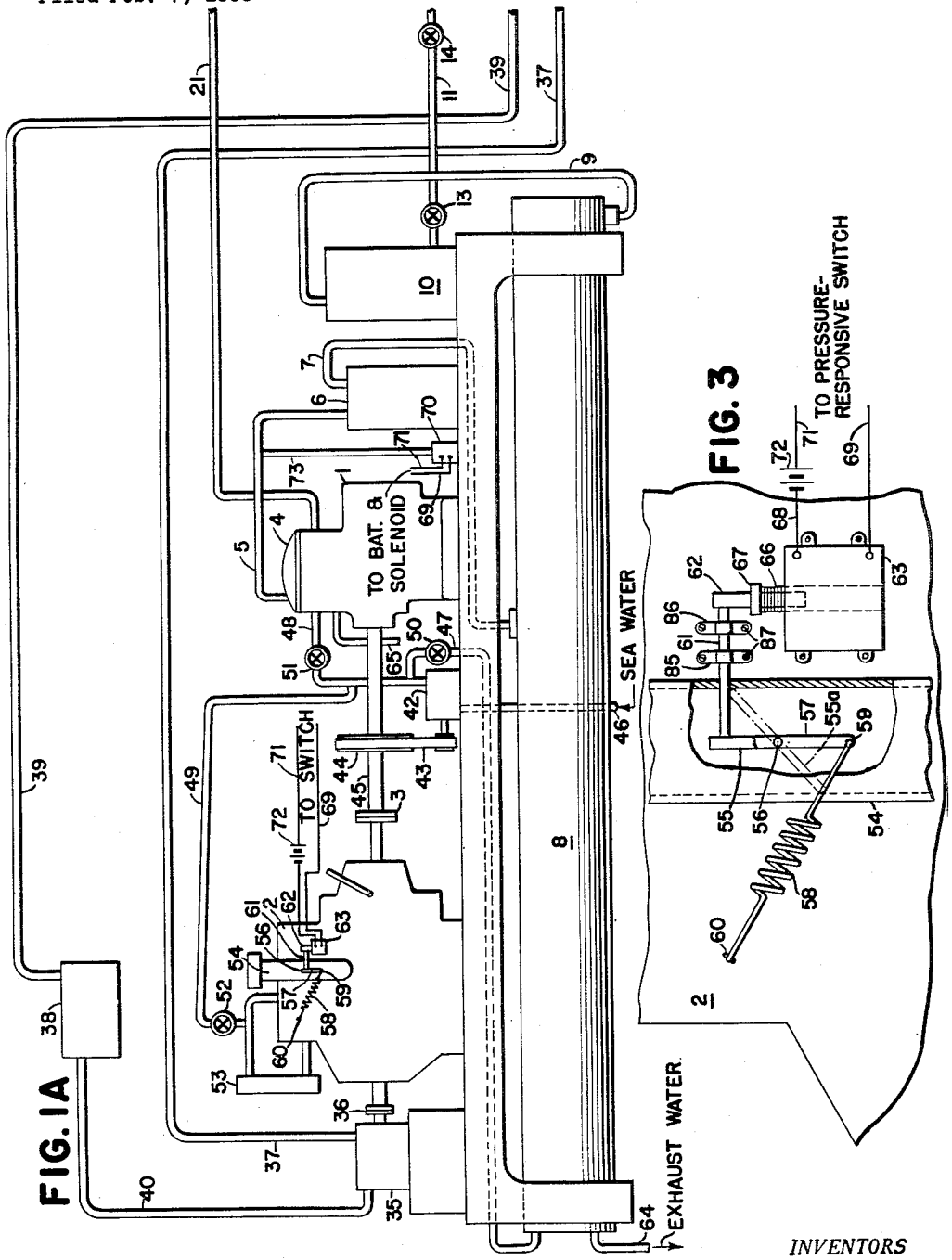
INVENTORS
WALTER H. CARPENTER, AND
WALTER L. MINGLEDORFF, JR.
BY Cushman, Darby & Cushman
ATTORNEYS

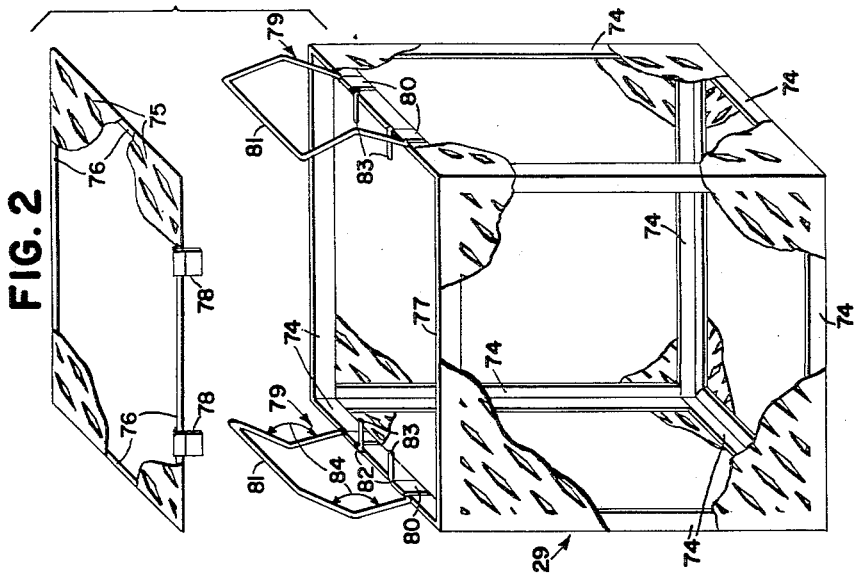
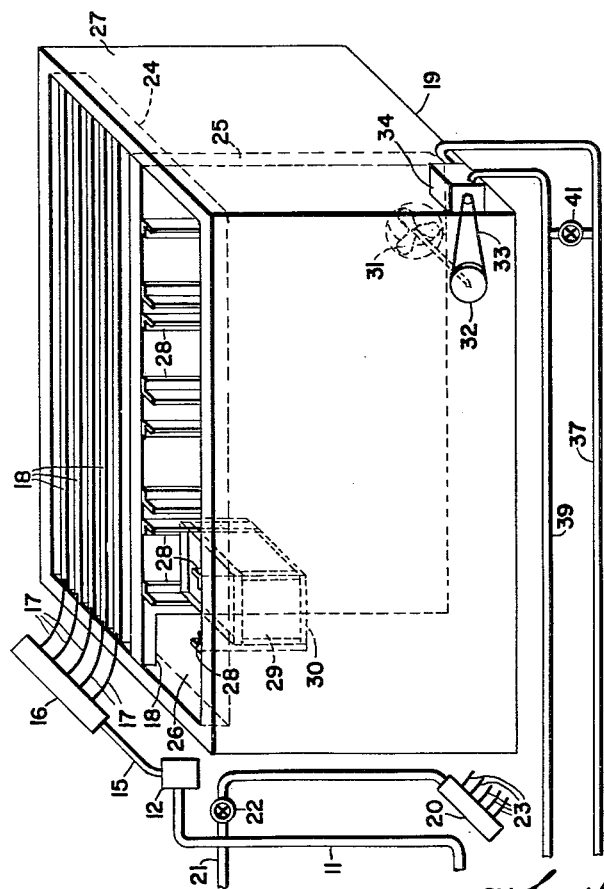

United States Patent Office 2,836,037
Patented May 27, 1958

2,836,037

REFRIGERATION SYSTEM

Walter H. Carpenter and Walter L. Mingledorff, Jr., Savannah, Ga., assignors to Mingledorff's, Inc., Savannah, Ga., a corporation of Georgia Application February 7, 1955, Serial No. 486,483

5 Claims. (Cl. 62—4)

This invention relates to refrigeration systems, and in particular to a compact refrigeration system and component equipment designed primarily for installation on fishing vessels, on which it is necessary to store the catch while the vessel is at sea. More particularly, the invention relates to refrigeration systems for use on shrimp boats, where it is necessary to store the shrimp catch for extended periods without deterioration or spoilage.

In shrimp fishing, it is becoming necessary for the fishing boats to stay out at sea for longer and longer periods as the off-shore banks become exhausted, and operations must be extended over greater distances. At the present time it has become necessary for fishermen to stay out for as long as three or four weeks, or even longer. In order to prevent spoilage, the shrimp must be frozen for storage. By methods presently in use, the shrimp are packaged and frozen, the packages are then reopened and the product glazed with fresh water, and then refrozen. These conventional operations involve movement of crew members into and out of the freezing chamber, and about fourteen hours is required to freeze a five pound package of shrimp.

A principal object of the present invention is to provide a compact refrigeration apparatus which may be readily installed aboard a boat, and which is capable of rapidly lowering and maintaining low the temperature of a freezing medium, in which shrimp may be frozen and glazed without sticking to each other.

Another object of the invention is to provide a refrigeration apparatus capable of freezing a large quantity of shrimp simultaneously, to such a low temperature that they may be safely stored in a separate hold for the duration of the voyage.

Still another object of the invention is to provide a shrimp freezing apparatus having unusually large capacity for short periods of time.

Yet another object is to provide a refrigeration apparatus including automatic safety means, operative to shut down the power source thereof in the event of a cooling water failure, or in the event of a rise in pressure in the system above a predetermined value.

A particular object of the invention is to provide novel basket means for holding the shrimp as they are being frozen. Further objects will be in part evident and in part pointed out hereinafter.

The invention and the novel features thereof may best be made clear from the following description and the accompanying drawings, in which:

Figure 1A is a schematic diagram of the mechanical portion of an exemplary embodiment of the system;

Figure 1B is a continuation of Figure 1A, illustrating the freezing tank and associated elements;

Figure 2 is a detailed illustration of the novel freezing basket employed in the invention, and Figure 3 illustrates details of the safety shut-off mechanism for the diesel engine powering the mechanism of Figure 1.

Referring to the drawings in detail, the apparatus comprises a compressor 1 in which a suitable refrigerant such as Freon is compressed. The compressor is driven by a diesel engine 2, to which it is coupled by means of coupling 3. Compressed hot refrigerant gas is conducted from compressor head 4 by pipe 5 to an oil trap 6, and from the oil trap by pipe 7 to the condenser 8, where it is cooled and liquified. The liquified refrigerant, under pressure, is carried by pipe 9 to receiver 10, from which it then flows through line 11 to expansion valve 12. Line 11 may be provided with line stop valves 13 and 14, to facilitate starting and shutting down the system. Cold evaporated refrigerant passes from the expansion valve 12 through line 15 to distributing manifold 16 and then, by means of tubes 17, to a number of Dole plates 18 mounted in one section of freezing tank 19. These Dole plates are well known in the refrigeration art, and consist essentially of sealed plates containing coils (not shown) and a freezing medium. Refrigerant circulates through the coils in the conventional manner. By immersing the coils in the freezing medium inside the plates, greater contact between the coils and the external freezing medium in the tank is achieved. Exhausted refrigerant is collected in return manifold 20 by means of tubes 23 from Dole plates 18, and then conducted by return line 21 back to compressor 1, from where it is then started on another refrigeration cycle. Return line 21 is provided with line stop valve 22.

Freezing tank 19 consists essentially of an insulated tank containing a freezing solution 24, to be described in greater detail below. The tank is provided with a partition 25 which separates the former into two compartments 26 and 27. Compartment 27 contains the Dole plates and compartment 26 contains a number of guide rails 28 mounted vertically on the side of the tank and on the partition 25. These rails serve to hold the freezing baskets 29 immersed in the freezing medium, while horizontal stop brackets 30 limit the depth to which the baskets are immersed, thereby permitting easy removal from the freezing tank.

To circulate the freezing medium in tank 19, there is provided a propeller 31 driven by pulley 32 and belt 33 by means of hydraulic motor 34. The hydraulic motor is operated by means of hydraulic pump 35 which is coupled by means of coupling 36 to diesel engine 2. Oil under pressure flows through line 37 to the hydraulic motor 34 and is returned to reservoir 38 by means of line 39. A line 40 connects the hydraulic reservoir 38 with pump 35, thus completing the circuit. A by-pass valve 41 connects hydraulic lines 37 and 39, permitting control of the speed of motor 34, and also permitting the motor to be stopped while the compressor is running. The propeller 31, as will be evident is mounted in a passage through the partition 25, and the opposite end of the partition terminates short of the tank wall, whereby the freezing medium may be circulated by the propeller from compartment 26 to compartment 27, and may return from compartment 27 to compartment 26 between the opposite end of the partition and the adjacent tank wall.

A novel feature of the invention comprises the three-way cooling system, permitting not only economy of space and equipment, but also providing an opportunity for indirectly utilizing the cooling system as a safety control over the entire system, as will be described in greater detail below.

The novel three-way cooling system comprises a single water pump 42 driven by the means of belt 43 and pulley 44 mounted on compressor shaft 45. Pump 42 draws sea water through pipe 46 and distributes it to the condenser 8, compressor head 4, and diesel engine cooling system 53 by means of pipes 47, 48 and 49, respectively. Valves 50, 51 and 52 are provided to control the flow of water in the respective water lines. Pipes 64 and 65 carry exhaust water overboard from the condenser and compressor, respectively.

As a safety means, and to protect the apparatus of the system, the air intake pipe 54 of the diesel engine is provided with a butterfly valve 55, rigidly mounted inside pipe 54 on rotatable shaft 56. A lever arm 57 is rigidly secured to the end of shaft 56, and is connected at one of its ends to one end of spring 58 by means of pin 59. The other end of spring 58 is secured to the engine block by means of pin 60. As will be evident from Figure 3, spring 58 would normally keep butterfly valve 55 in a closed position, permitting no air to the engine cylinders. In order to keep the air intake open for operation, a trigger rod 61 engages lever arm 57 in a vertical position and holds valve 55 in an open position parallel to the axis of the intake pipe. Trigger rod 61 is guided by a pair of guides 85 and 86 mounted on the engine by means of bolts 87 and is kept from moving by means of armature 62 of solenoid 63 also mounted on the engine block. As long as solenoid 63 remains unergized, armature 62 is held outside the solenoid by means of spring 66 which bears against the case of the solenoid and against collar 67 fastened to the armature. Thus, as long as no current is supplied to the solenoid, spring 66 will keep armature 62 extended and trigger 61 will be poised between the armature and lever 57, maintaining the butterfly valve in its open position.

One wire 68 from solenoid 63 is connected to one side of a low voltage source by direct current, such as diesel starting battery 72. The other lead 69 from the solenoid is connected to one terminal of a conventional pressure responsive normally open switch 70, mounted at any convenient point on the apparatus. The second terminal of switch 70 is connected by means of wire 71 to the other side of battery 72. A tube 73 connects switch 70 to pipe 5 coming from the high pressure side of compressor 1. Switch 70 is adjusted to remain open as long as the pressure in the compressor head remains below a predetermined value. In the event of an undue rise in pressure, this excess pressure, which is communicated by means of tube 73 to switch 70, closes the switch and energizes the solenoid. The creation of a magnetic field in the solenoid causes armature 62 to be retracted, releasing trigger 61. Spring 58 thereupon pulls butterfly valve 55 into the shut position, indicated by dotted line 55a, and shuts off the supply of air to the diesel engine, stopping the latter.

The advantages of the above-described arrangement will be apparent from the following considerations. Two separate factors may cause an abnormal rise in head pressure, a failure of the water supply used for cooling the compressor, or an accumulation of trash or scale in the condeser tubes. When this occurs, the pressure responsive switch closes, energizing the solenoid and shutting down the entire system.

Another novel feature of the invention is the construction of the baskets for holding the shrimp while they are being frozen. Each basket comprises a framework of flat stainless steel bars 74 secured to one another by welding or in any other suitable manner. The four sides and bottom of the basket are preferably made of ½ inch mesh stainless steel expanded metal, and are permanently secured to the frame in any suitable manner. A cover 75 made of a rectangular frame of stainless steel rods 76 covered with expanded metal is hinged to one upper edge 77 of the vertical sides by means of hinges 78, secured to the upper edge in any suitable manner, as by welding, riveting or bolting. Cover 76 is coextensive with and completely covers the open top of the basket. The basket is further provided with a pair of specially designed handles 79. The latter are rotatably mounted on opposite upper edges of the vertical sides by means of hinges 80, which permit rotation of the handles either into the basket when the cover is raised or outward so that they may rest against the outside of the basket.

Each handle 79 is provided with a gripping portion 81 and, opposite the gripping portion and parallel to it, a pair of short portions 82, which pass through hinges 80. Extensions 83 on the portions 82 constitute stop members, and are set in such a direction that, when the handle is dropped into the basket, stops 83 come to rest against the inner surface of the vertical side and leave gripping portion 81 extended just below the open top and in a plane substantially parallel therewith. The handles thus do not interfere with the closing of cover 75 and at the same time obviate the necessity of reaching down deep into the basket to grasp the handles when it is desired to carry it with the cover open. Furthermore, the novel construction of the handles permits swinging them completely outward and then closing the cover. It is then possible to carry the basket closed. Thus, with the handles remaining outside, stops 83 come to rest against the closed cover and keep the handles erect. This is advantageous when lowering the basket into and removing it from the freezing tank, and the stops 83 serve to keep the closed cover from rising under the upward pressure of floating shimp. In positioning the baskets in the tank, the handles are disposed between the guides 28, so that the tank walls maintain the handles erect and insure that the basket covers remain closed. Another feature of the novel handle is the bend provided in the sides, as indicated by the angle 84. This bend, as seen from Figure 2, is in an inward direction. When the handles are permitted to rest against the outer wall of the vertical sides, gripping portion 81 is offset, making it easy to grasp the handle by inserting the fingers between gripping portion 81 and the basket sides. When the handles are erect with the stops 83 holding the cover closed, and the basket is positioned in the tank, the offset disposes the gripping portions away from the sides of the tank, and permits easy grasp of the handles by inserting the fingers between the gripping portions 81 and the tank walls.

In a specific embodiment of the invention, the refrigeration unit may be located in the engine room of the fishing boat, with the freezing tank located on deck. Alternatively, the refrigeration unit may be located in the cargo hold, and the freezing tank in the deck house. The insulated tank is made of stainless steel, and may be about 4' 6" wide, 7' 10" long, and 4' high in overall dimensions, and is provided with an insulated stainless steel cover (not shown).

The refrigeration unit may be powered by a standard diesel engine of suitable capacity, or other prime mover. With a matching compressor, the freezing medium in the tank can be easily cooled to and maintained at a temperature of about 0° F. A particularly advantageous solution comprises about 750 pounds of glucose, preferably cerelose or commercial dextrose, and about 750 pounds of fine table salt in 375 gallons of water. The solution may be made up by first dissolving substantially all of the sugar in the water at room temperature. Thereafter, the salt may be added and completely dissolved in the sugar solution. In these proportions, the solution will not freeze at 0° F. It has been found that shrimp, when dipped into this solution when cold and agitated, freeze solid in from five to six minutes, although in practice, it is preferred to keep the shrimp immersed for about fifteen minutes. The frozen shrimp retain a syrupy coating which permits them to be stored in open boxes or in bulk without sticking together.

In actual practice, the shrimp are headed and then put into the above described freezing baskets, which are about 18¼ inches long, 10¼ inches wide, and 20 inches deep. A basket of these dimensions will hold about 50 pounds when half full. The shrimp are washed, and then immersed in the freezing tank with the solution at a temperature of from 0° to 5° F. By initially moving the baskets up and down several times the shrimp are prevented from sticking during freezing. After fifteen minutes, the baskets with the frozen shrimp are removed from the freezing solution and emptied into any suitable container, in which the shrimp may be stored in the cargo hold or other storage room. Once treated in the described manner, the shrimp need not be touched for the remainder of the trip and will keep in storage for ninety days or longer. The freezing tank being located outside thereof, movement of the crew into and out of refrigerated spaces is entirely avoided.

In the manner described above, the compact apparatus described is capable of freezing 150 to 300 pounds of shrimp per hour continuously over long periods of time depending on the refrigerating capacity of the compressor. The use of the freezing plates 18 is particularly advantageous, in that the freezing medium may be solidified on and between the plates, to store up large quantities of refrigeration. The freezing medium described, for example, will solidify at a temperature slightly below 0° F. An unexpected and highly advantageous advantage of the solution previously described is that it will solidify without precipitation of the solid, and liquify again at substantially the same temperature at which it solidifies. The solution may be frozen and melted repeatedly, without altering its chemical and physical structure.

In fishing for shrimp, there are normally extended periods in which there are no shrimp to be frozen. During these periods, the apparatus may be operated, with a moderate amount of circulation of freezing medium. In approximately ten hours the bulk of the space between the plates may be in such manner filled with solidified medium. Under these circumstances, 700 or 800 pounds of shrimp may be frozen in one hour, without completely melting the solidified medium on the plates, the temperature of the liquid medium rising to about 10° F. as each load (normally 200 pounds) of shrimp is immersed, but quickly recovering to about 0° F. In this manner the relatively small and compact apparatus may be operated continuously to effect great freezing capacity for short periods of time, as is normally required.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:

1. A refrigeration system comprising a refrigerant compressor, a motor driving said compressor, a condenser connected to the output side of the compressor for cooling and condensing the compressed refrigerant, a single pump operated by said motor connected to and supplying cooling water to both said compressor and said condenser, a tank containing a cooling medium, heat exchange means carrying refrigerant immersed in said cooling medium and connected to said condenser and said compressor, and means for circulating the cooling medium in the tank in contact with the immersed heat exchange means.

2. A refrigeration system as defined in claim 1, including pressure-responsive safety means connected to the high pressure side of said compressor adapted to shut off said motor when the compressor pressure rises above a predetermined limit.

3. A refrigeration system comprising a refrigerant compressor, a diesel engine driving said compressor, a condenser connected to the output side of the compressor for cooling and condensing the compressed refrigerant, a single pump operated by the diesel engine connected to and supplying cooling water to said compressor, condenser and the cooling system of said diesel engine, a tank containing a cooling medium, heat exchange means carrying refrigerant immersed in said cooling medium and connected to said condenser and said compressor, and means for circulating the cooling medium in the tank in contact with the immersed heat exchange means.

4. A refrigeration system as defined in claim 3, including pressure-responsive safety means connected to the high pressure side of said compressor adapted to shut off said diesel engine when the compressor pressure rises above a predetermined limit.

5. A refrigeration system as defined in claim 4, wherein said safety means includes a normally open pressure-responsive switch in communication with the high pressure side of said compressor, a solenoid in circuit with said switch, a normally open valve in the air intake line of said diesel engine, and a mechanical connection between said solenoid and said valve, a rise in pressure in the compressor above a predetermined limit being effective to close said switch and actuate said solenoid, whereby said valve is closed and the engine shut off.

References Cited in the file of this patent

UNITED STATES PATENTS

| Number | Name | Date |
|---|---|---|
| 1,388,295 | Peterson | Aug. 23, 1921 |
| 1,942,307 | Reeh | Jan. 2, 1934 |
| 2,117,505 | Reinhardt | May 17, 1938 |
| 2,205,259 | Harbison | June 18, 1940 |
| 2,211,153 | Noyes | Aug. 13, 1940 |
| 2,284,798 | Boose | June 2, 1942 |
| 2,304,860 | Taylor | Dec. 15, 1942 |
| 2,436,426 | Fish | Feb. 24, 1948 |
| 2,512,066 | Lenifor | June 20, 1950 |
| 2,538,015 | Kleist | Jan. 16, 1951 |
| 2,538,016 | Kleist | Jan. 16, 1951 |
| 2,613,847 | Lacher | Oct. 14, 1952 |
| 2,614,403 | Heise | Oct. 21, 1952 |
| 2,674,101 | Calling | Apr. 6, 1954 |
| 2,746,272 | Carpenter | May 22, 1956 |
| 2,766,598 | Amiot | Oct. 16, 1956 |